United States Patent
Giampaolo et al.

(10) Patent No.: US 10,386,471 B1
(45) Date of Patent: Aug. 20, 2019

(54) VELOCITY ESTIMATION WITH LINEAR FREQUENCY MODULATED (LFM) WAVEFORMS

(71) Applicant: Lockheed Martin Corporation, Bethesda, MD (US)

(72) Inventors: Jude C. Giampaolo, Bensalem, PA (US); John A. MacLachlan, Mount Laurel, NJ (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 464 days.

(21) Appl. No.: 15/054,463

(22) Filed: Feb. 26, 2016

(51) Int. Cl.
*G01S 13/58* (2006.01)
*G01S 15/58* (2006.01)

(52) U.S. Cl.
CPC .......... *G01S 13/583* (2013.01); *G01S 15/586* (2013.01)

(58) Field of Classification Search
CPC ....... G01S 13/58–64; G01S 13/34–348; G01S 13/536; G01S 15/58–62; G01S 15/8984; G01S 17/58; G01S 17/32–36; G01S 15/584–586; G01S 15/32–36
See application file for complete search history.

(56) References Cited

U.S. PATENT DOCUMENTS

| 3,821,737 A * | 6/1974 | Kalmus | F42C 13/045 102/214 |
| 2007/0080853 A1* | 4/2007 | Eriksson | G01S 7/2806 342/134 |

* cited by examiner

*Primary Examiner* — Matthew M Barker
(74) *Attorney, Agent, or Firm* — Howard IP Law Group

(57) ABSTRACT

A method of estimating velocity from a return signal originating from a single linear frequency modulated (LFM) signal. The method includes the steps of receiving a return signal originating from a transmitted LFM signal. A first filter is applied to the return signal for generating a first response signal. A second filter is also applied to the return signal for generating a second response signal. An estimate of velocity of a potential target identified in the return signal is calculated according to the ratio of the second response signal to the first response signal.

20 Claims, 5 Drawing Sheets

VELOCITY ESTIMATION WITH LINEAR FREQUENCY MODULATED (LFM) WAVEFORMS

STATEMENT OF GOVERNMENT INTEREST

This invention was made with Government support under Contract No. FA8709-14-C-0003 awarded by the Department of the Air Force. The Government has certain rights in this invention.

FIELD OF THE INVENTION

The present invention relates to signal processing systems and methods, and more particularly, to signal processing systems and methods for estimating target velocity from a single transmitted linear frequency modulated (LFM) waveform pulse in a radar system.

BACKGROUND

Signal processing systems, such as radar and sonar systems, are useful for detecting, characterizing and monitoring various kinematic parameters associated with natural and/or man-made objects, and are important for both civilian and military operations. In radar systems, for example, one or more transmitted pulses or electromagnetic (EM) signals are intended to engage one or more objects or targets. Reflected return signals (or echoes) are received and processed for object identification and characterization. Several types of transmitted signals may be used. For example, single pulse, multiple pulse, and LFM waveforms may be used, with each waveform type having particular advantages in terms of target detection and velocity and acceleration estimation, by way of example only.

One strength of LFM waveforms is their tolerance to Doppler mismatch in pulse compression processes. More specifically, Doppler mismatch is an effect that occurs when a received waveform is shifted in frequency away from a transmitted frequency due to target motion (i.e. the Doppler effect). This causes a loss in signal amplitude from an ideal value during pulse compression processing. Tolerance to this Doppler mismatch includes the ability of a waveform modulation to have a minimized reduction in signal level as a frequency shift increases. This contrasts Doppler intolerant modulations which exhibit extreme reductions in signal level.

LFM waveforms, however, experience a range/Doppler coupling effect which results in an ambiguity determining a target's range, as this range is offset by an amount proportional to an unknown velocity. As will be understood by one of ordinary skill in the art, range/Doppler coupling is a phenomenon affecting LFM waveforms that occurs where a non-zero Doppler frequency shift offsets a target's apparent range away from a true target range. The magnitude of the coupling is directly proportional to the pulse length and inversely proportional to the bandwidth of the LFM waveform. If a target's velocity is known this offset can be calculated and removed to produce an accurate range estimate. However, current processing techniques require multiple transmitted and return LFM waveform pulses in order to estimate velocity.

Alternative signal processing systems and methods for estimating velocity from as little as a single LFM waveform pulse are desired.

SUMMARY

In one embodiment of the present disclosure, a method of estimating velocity from a return signal originating from a single LFM waveform pulse is provided. The method includes the steps of receiving a return signal from a transmitted LFM signal and applying a first filter to the return signal for generating a first response signal. A second filter is also applied to the return signal for generating a second response signal. An estimate of the velocity of a potential target identified in the return signal is calculated according to the ratio of the second response signal to the first response signal.

In another embodiment of the present disclosure, a signal processing system is provided. The system includes a receiver configured to receive a return signal originating from a transmitted LFM signal. An analog to digital converter is provided for converting the received return signal to digital form. The system further includes one or more computer processors, and a memory storing program instructions in communication with the one or more processors. The one or more processors is operative with the program instructions to apply a first filter to the return signal for generating a first response signal, and apply a second filter to the return signal for generating a second response signal. An estimate of the velocity of a potential target identified in the return signal is calculated based on the ratio of the second response signal to the first response signal.

DETAILED DESCRIPTION

Figure 1:
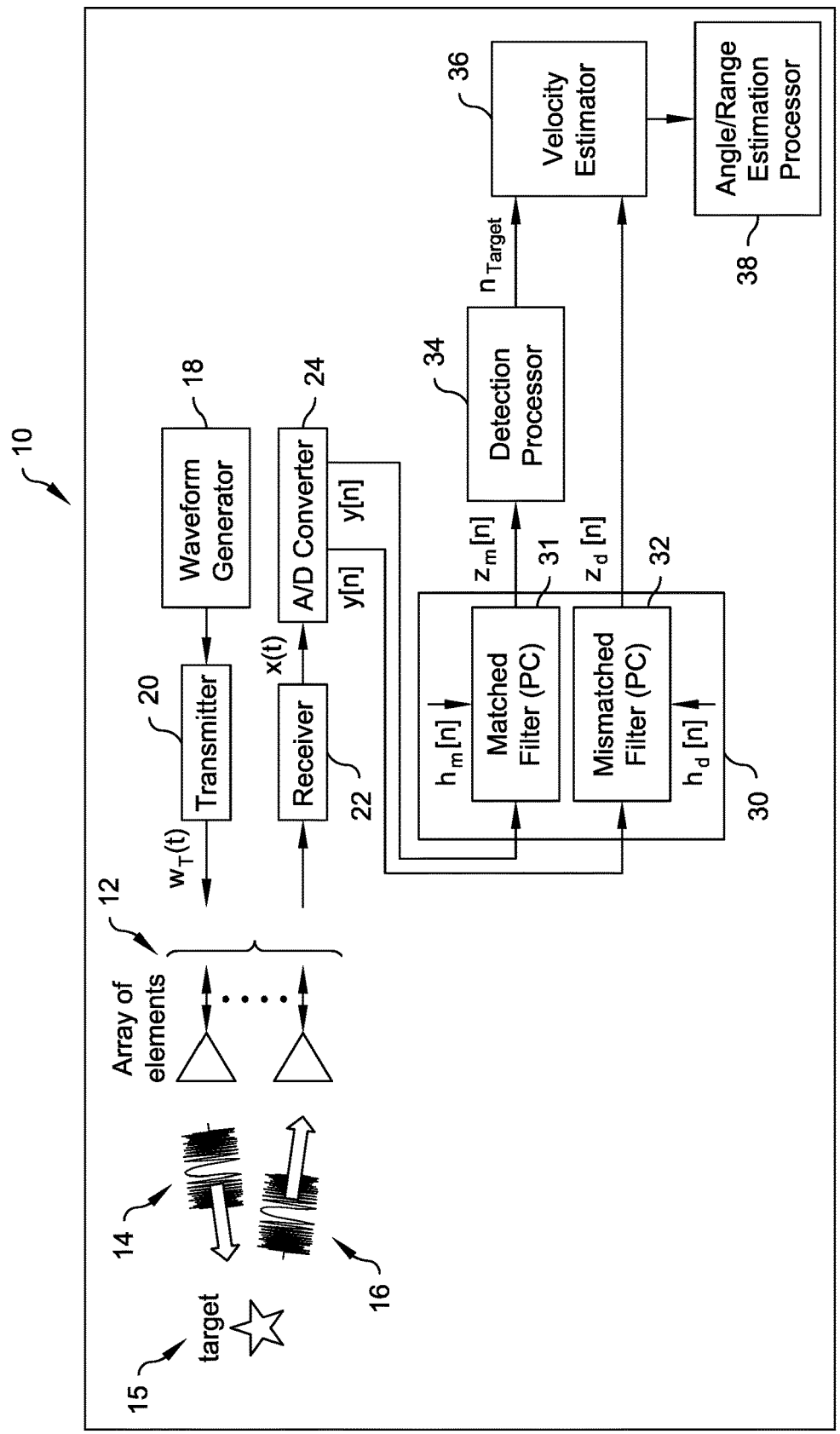
FIG. 1 is a simplified schematic diagram of a radar system according to an embodiment of the present disclosure.

It is to be understood that the figures and descriptions of the present invention have been simplified to illustrate elements that are relevant for a clear understanding of the present invention, while eliminating, for purposes of clarity, many other elements found in signal processing systems, including radar systems. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Embodiments of the present disclosure implement target velocity estimation from, for example, a single transmitted LFM waveform pulse and corresponding received return signal originating therefrom. In one embodiment, a received return signal is processed using conventional pulse compression techniques performed with a matched filter for generating a matched filter response, or matched filter pulse compression response. Velocity estimation according to embodiments of the present disclosure is implemented by performing an additional pulse compression and filtering operation with a "mismatched" pulse comprehension filter for generating a mismatched filter pulse compression response. As will be understood by one of ordinary skill in the art, in normal pulse compression operations, a matched filter is used with the intent of maximizing the signal to noise ratio (SNR) of a received signal at a tuned velocity (e.g. Doppler frequency). Mismatched filters according to embodiments of the present disclosure, in distinction, are configured to produce nulls at this tuned velocity or frequency. For LFM waveforms, this filter may be generated by inverting the sign of a second half of a reference pulse of the LFM waveform in the time domain prior to the generation of the filter. More specifically, in one embodiment a matched filter is generated from a priori known transmitted pulse by time reversing the pulse samples and taking the complex conjugate of the time reversed pulse. This traditional matched filter to the transmitted pulse is applied (i.e. convolved) with the received signal. Similarly, a mismatched difference filter is generated from the a priori known transmitted pulse by time reversing the pulse samples and taking the complex conjugate of the time reversed pulse. Unlike the matched filter response, an additional step is performed wherein the sign of the second half of the time reversed pulse is negated.

The resulting mismatched filter is applied (i.e. convolved) a received return signal in parallel with the application of the matched filter. The ratio of a real portion of mismatched filter pulse compression response to the real portion of the matched filter pulse compression response is then calculated for samples of the received signal where a target has been identified. This ratio has been found to be related to the frequency offset of a target return relative to the tuned frequency of the pulse compression filter pair. From this frequency offset, an estimate of an identified target's velocity can be calculated.

Referring generally to FIG. 1, embodiments of the present disclosure will be further described herein as implemented into an exemplary radar system (e.g. a pulse-Doppler radar system). Radar system 10 may comprise a front-end module including a transmitter 20 responsive to a waveform generator 18 for generating and transmitting a signal or waveform $w_T(t)$. Waveform $w_T(t)$ is provided to an array of transmitting and/or receiving antenna elements 12 for producing a corresponding transmitted radar waveform 14. As set forth above, these transmitted waveforms 14 may take the form of EM signal transmissions comprising one or more LFM waveform pulses. In operation, transmitted waveform 14 is reflected off of a target 15, generating a return signal or echo 16. Return signal 16 is subsequently received or captured by antenna elements 12 and provided to at least one receiver 22 for signal modulation. Receiver 22 may include various processing components, such as one or more filters, low-noise amplifiers and down converters, as will be understood by one of ordinary skill in the art. At least one analog to digital converter (ADC) 24 is provided for converting a received analog return signal x(t) to digital form.

System 10 may also include, by way of non-limiting example, a digital processing system, including a pulse compression module 30 operative to receive post-ND digitized in-phase and quadrature-phase (I/Q) signal data y[n] from the output of the front end module (e.g. from ADC 24). As will be understood by one of ordinary skill in the art, pulse compression techniques may be implemented to achieve high range resolution without the need for high-powered antennas. Pulse compression may be accomplished by various filtering and/or line delay arrangements. By way of background, pulse compression may be achieved by applying a Fast Fourier Transform (FFT) to a received time-domain signal, thereby converting the data to the frequency domain. A weighting factor, or pulse compression weight (e.g. in the form of a vector-matrix) is applied in the frequency domain. An inverse FFT (IFFT) is applied to return the data streams to the time-domain.

More specifically, pulse compression module 30 according to embodiments of the present disclosure includes a first or matched filter 31 ($h_m[n]$) for performing matched filtering operations, as well as a mismatched filter 32 ($h_d[n]$). Each filter 31,32 is responsive to the same digitized complex received return signal y[n] from ADC 24. The output of matched filter 31, or matched filter response $z_m[n]$, is provided to a detection processor 34 for performing target detection operations. By way of non-limiting example, detection processor 34 is operative to perform a target detection process against a time-averaged background map. These detection processes may include one or more of "greatest of" operations, as well as perform constant false alarm rate (CFAR) detection techniques. The results of this detection processing may be provided to a display device (not shown) for end-user interfacing. In one embodiment, detection processor 34 may identify samples $n_{target}$ of the matched filter response $z_m[n]$ in which a target (or potential target) is present.

A velocity estimator or estimation processor 36 is responsive to the matched filter response $z_m[n]$ and an output of mismatched filter 32, or mismatched filter response $z_d[m]$, as well as the identified samples $n_{target}$ containing targets for estimating velocity. As will be set forth in greater detail herein, velocity estimator 36 may calculate a velocity of a target according to a ratio of a real portion of the mismatched filter response $z_d[n]$ to a real portion of the matched filter response $z_m[n]$ associated with the identified samples $n_{target}$. Once a target velocity has been estimated, it may be provided to an angle and/or range estimation processor 38 for producing a range estimate of the identified target.

It should be understood that during normal operation of radar system 10, the output of pulse compression module 30 may be subject to further traditional processing, such as sampling the incoming data into range cells or bins, and generating one sample in each range bin for each pulse. Range bin data is provided to Doppler filters (not shown) which generate a series of Doppler bins for each range cell. Data from a particular Doppler bin corresponds to a signal from a target or background, at a given range, moving at a particular velocity.

Figure 2:
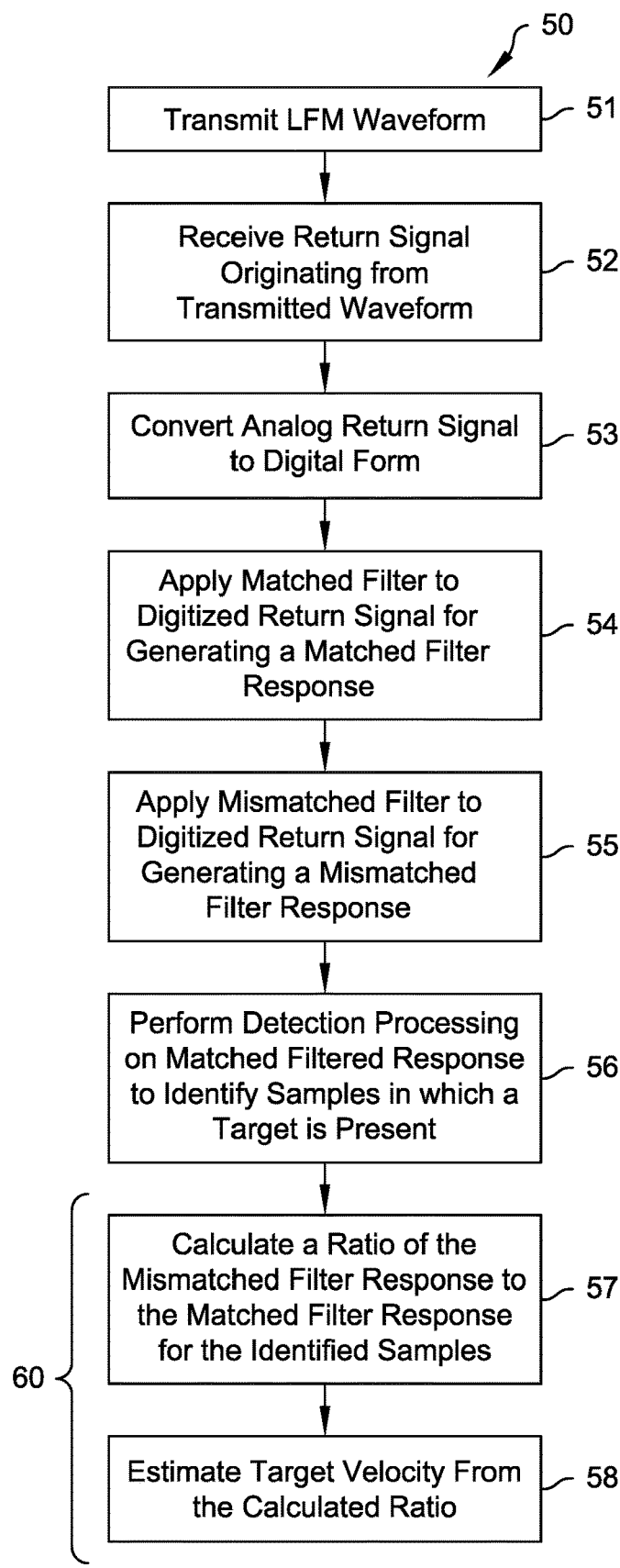
FIG. 2 is a process flow diagram illustrating an exemplary signal processing method according to an embodiment of the present disclosure.
Figure 3:
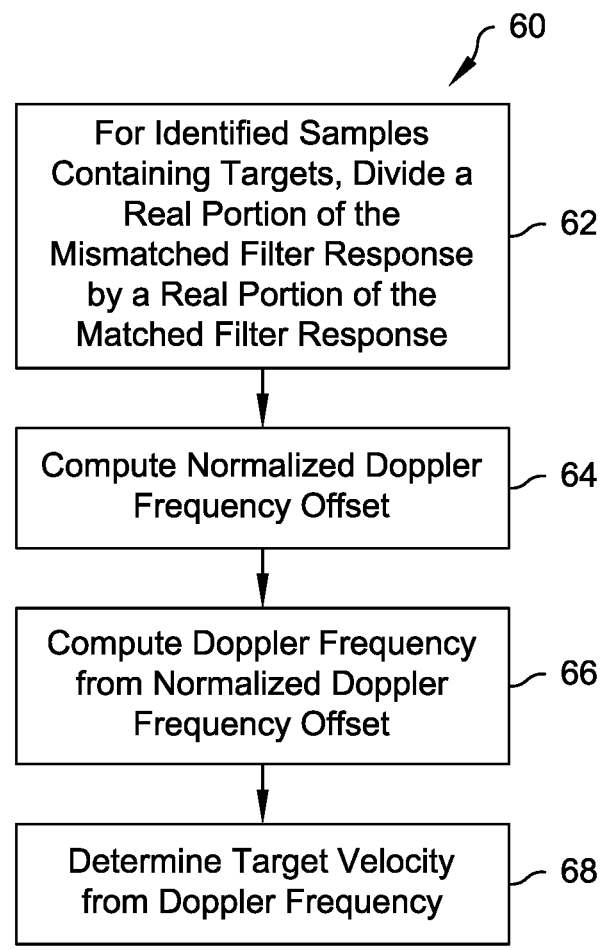
FIG. 3 is another process flow diagram illustrating an exemplary signal processing method according to an embodiment of the present disclosure.

FIGS. 2 and 3 are process diagrams illustrating a velocity estimation method 50 according to an embodiment of the present disclosure. Method 50 may be embodied as a set of instructions executed by one or more radar control processors of a signal processing system, such as a control processor of radar system 10 as shown and described with respect to FIG. 1. A system operating with the following exemplary parameters has been assumed for the purposes of this description, and provides the basis for the accompanying FIGS.: 200 kHz LFM waveform bandwidth, 2 millisecond (ms) pulse width, 1 megahertz (MHz) I/Q sampling rate, a pulse compression tune centered at zero velocity (i.e. a matched filter tuned to zero velocity), and a +/−250 kilohertz (KHz) range of input Doppler frequency offsets.

As set forth above, LFM waveform $w_T(t)$ may be generated and transmitted 51 by an exemplary radar system. Reflected return signal x(t), originating from the transmitted waveform $w_T(t)$, is received 52, and converted 53 to digital form by sampling the return signal x(t) in the digital domain with sample period T:

$$y[n]=x(nT) \quad \text{Eq. 1}$$

Figure 4:
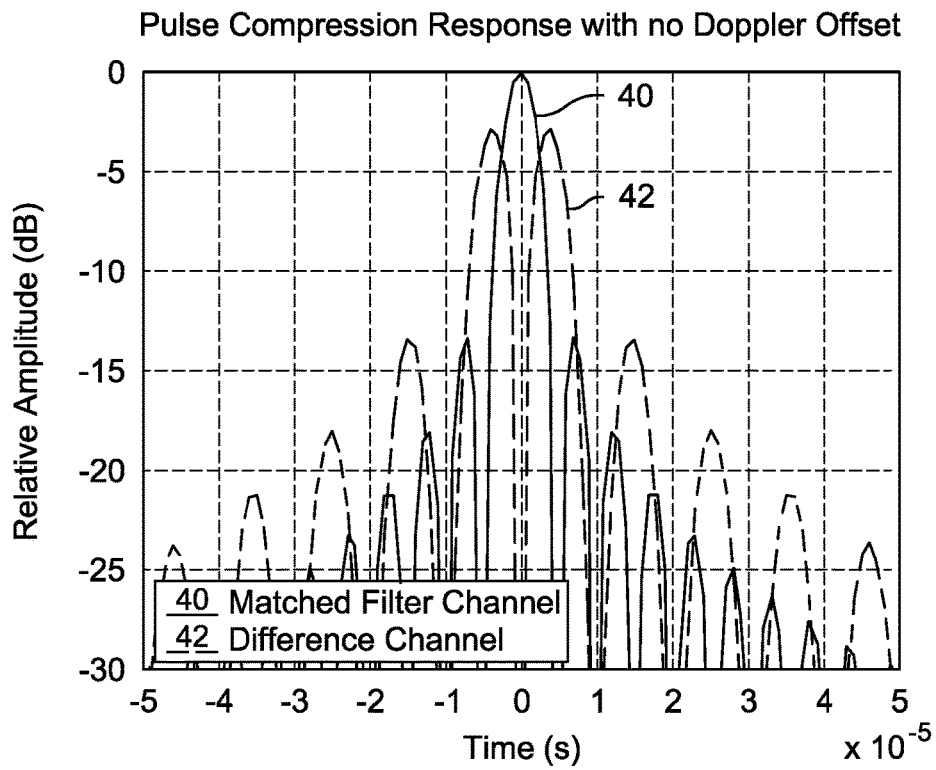
FIG. 4 is a graphical representation of exemplary pulse compression responses of a matched filter and a corresponding unmatched filter utilized in a signal processing system and method according to embodiments of the present disclosure.
Figure 5:
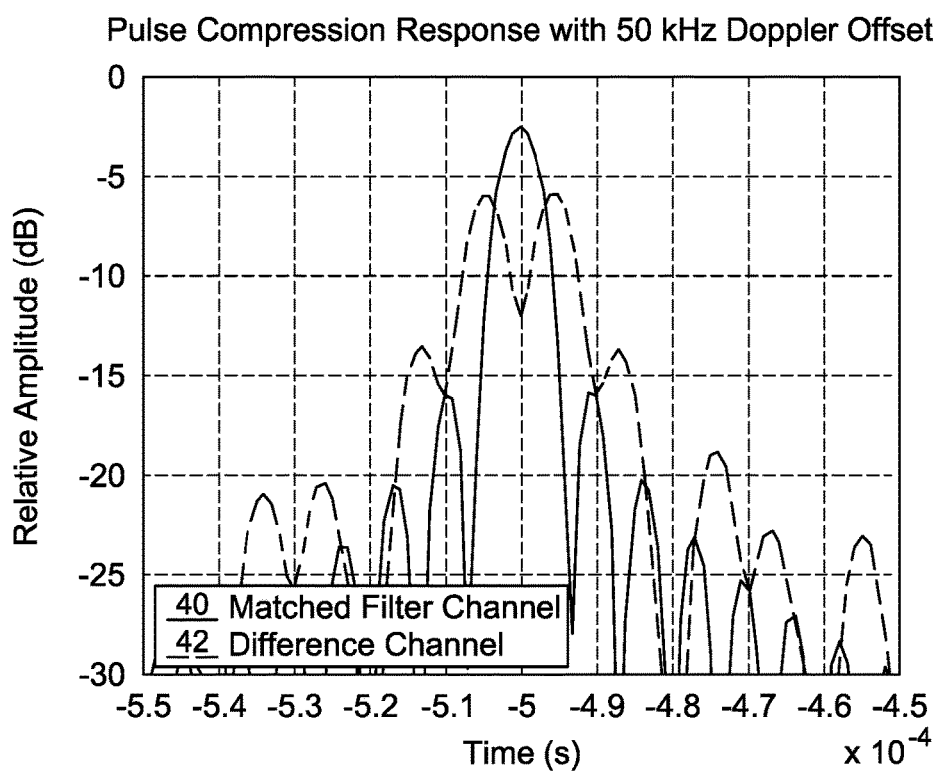
FIG. 5 is a graphical representation of another exemplary pulse compression response of a second matched filter and of a second corresponding unmatched filter utilized in a signal processing system and method according to embodiments of the present disclosure.

The resulting digitized received signal y[n] is processed via pulse compression techniques. This includes applying 54 the matched pulse compression filter $h_m[n]$ to the signal y[n] for generating the matched filter pulse compression response $z_m[n]$. Exemplary matched filter pulse compression responses 40 are illustrated in FIG. 4 (zero Doppler Offset) and FIG. 5 (50 KHz Doppler Offset).

In one embodiment, the matched filter $h_m[n]$ is defined by a sampled, time-reversed, complex conjugate of a transmitted waveform $w_s[n]$:

$$w_s[n]=w_T(nT) \quad \text{Eq. 2}$$

$$h_m[n]=\text{conj}(w_s[-n]) \quad \text{Eq. 3}$$

Pulse compression is performed by convolving the received signal y[n] with the matched filter $h_m[n]$. This processing may be performed in either the time or frequency domain:

$$z_m[n]=y[n]*h_m[n]=\Sigma_l y[n-l]\cdot h_m[l] \quad \text{Eq. 4}$$

In parallel with this matched filter processing, a mismatched pulse compression filter $h_d[n]$ is applied 55 to the digitized received signal y[n] for generating the mismatched filter pulse compression response $z_d[n]$. Exemplary mismatched filter pulse compression responses 42 are illustrated in FIG. 4 (zero Doppler Offset) and FIG. 5 (50 KHz Doppler Offset).

A mismatched difference reference $w_d[n]$ is defined by sampling the transmit waveform $w_s[n]$ (of length K samples) with the sign of the samples of the second half of the waveform inverted:

$$w_d[n] = \begin{cases} w_s[n] & n \le K/2 \\ -w_s[n] & n > K/2 \end{cases} \quad \text{Eq. 5}$$

The mismatched filter $h_d[n]$ according to an embodiment of the present disclosure is defined with by a sampled, time-reversed, complex conjugate of the mismatched difference reference $w_d[n]$:

$$h_d[n]=\text{conj}(w_d[-n]) \quad \text{Eq. 6}$$

Pulse compression is performed by convolving the receive signal y[n] with the mismatched filter $h_d[n]$. This processing may be performed in either the time or frequency domain:

$$z_d[n]=y[n]*h_d[n]=\Sigma_l y[n-l]\cdot h_d[l] \quad \text{Eq. 7}$$

Detection processing is performed 56 on the matched filter pulse compression response $z_m[n]$ to identify samples $n_{target}$ in which a target is present. Using the matched filter pulse compression response $z_m[n]$, the mismatched filter pulse compression response $z_d[n]$, and the identified samples $n_{target}$, a velocity estimation operation 60 may be performed (e.g. performed by velocity estimator 36, FIG. 1). Operation 60 includes, for samples $n_{target}$, calculating 57 a ratio of the mismatched filter pulse compression response $z_d[n]$ to the matched filter pulse compression response $z_m[n]$. From this ratio, target velocity can be estimated 58.

More specifically, referring generally to FIG. 3, velocity estimation operation 60 includes, for those samples $n_{target}$ in which a target was identified, dividing 62 a real portion of the mismatched filter pulse compression response $z_d[n]$ by a real portion of the matched filter pulse compression response $z_m[n]$:

$$r = \text{Re}\left\{\frac{z_d[n_{target}]}{z_m[n_{target}]}\right\} \quad \text{Eq. 8}$$

Figure 6:
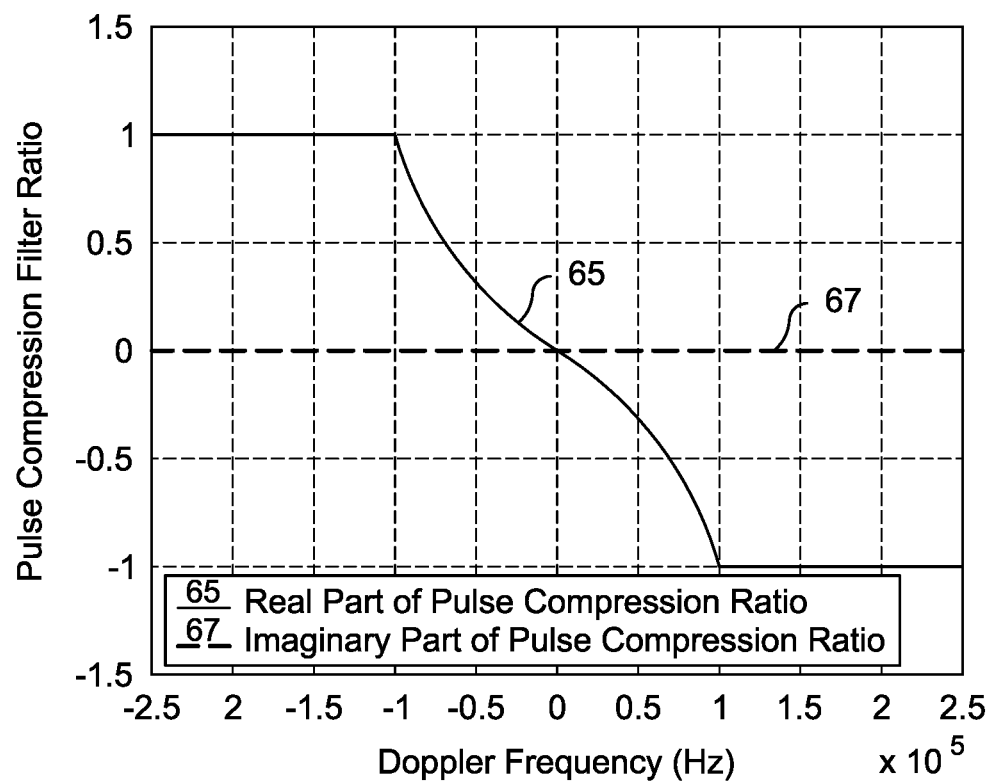
FIG. 6 is a graphical representation illustrating the real and imaginary portions of a ratio of an output of an unmatched filter to an output of a matched filter utilized in a signal processing system and method according to embodiments of the present disclosure.

In the case of LFM waveforms, the real part of the pulse compression ratio is given by:

$$r = \frac{\left(\frac{\Delta f}{B}\right)}{\left|\frac{\Delta f}{B}\right|-1} = \frac{\Delta \tilde{f}}{|\Delta \tilde{f}|-1} \quad \text{Eq. 9}$$

wherein r is the pulse compression ratio, $\Delta f$ is the Doppler frequency offset, B is the waveform bandwidth, and $$\Delta \tilde{f} = \frac{\Delta f}{B}$$

is the normalized Doppler frequency offset. This expression is valid when the absolute value of the normalized Doppler frequency offset is less than one. FIG. 6 illustrates both the real portion 65 and imaginary portion 67 of an exemplary pulse compression ratio r.

The value of the ratio r is used to compute 64 the normalized Doppler frequency offset $\Delta \tilde{f}$. Specifically, inverting this expression allows for the normalized Doppler frequency offset to be solved for in terms of the pulse compression ratio:

$$\Delta \tilde{f} = -\frac{r}{1+|r|} \quad \text{Eq. 10}$$

From the normalized Doppler frequency offset $\Delta \tilde{f}$, Doppler frequency $\Delta f$ is computed 66 by multiplying the normalized Doppler frequency offset $\Delta \tilde{f}$ by the waveform bandwidth B:

$$\Delta f = B \cdot \Delta \tilde{f} \quad \text{Eq. 11}$$

Finally, Doppler frequency Δf is used to determine 68 the velocity v (i.e. range rate) of the target:

$$v = -\frac{\Delta f}{f_c}\frac{c}{2} \qquad \text{Eq. 12}$$

wherein $f_e$ is the carrier frequency and c is the speed of propagation (e.g. the speed of light for a radar system).

While embodiments of the present disclosure have been described using an exemplary radar system, it should be understood that these embodiments can be applied to any system that uses, for example, LFM waveforms and associated pulse compression, including sonar systems. Moreover, it is envisioned that other waveform types, including NLFM and phase coded waveforms, can utilize similar processing techniques to those set forth above with suitable modifications to the pulse compression ratio to Doppler frequency offset relationships.

While embodiments of the present disclosure have been described using a single matched filter and a single mismatched filter tuned for a zero velocity, it should be understood that a pulse compression module according to embodiments of the present disclosure may include a filter bank comprising multiple velocity tuned filters (both matched and mismatched). These embodiments may be advantageous for applications where multiple velocity tunes (i.e. non-zero tunes) are required for minimize velocity mismatch loss. Multiple tunes may also be desired when the range of anticipated Doppler frequency shifts is greater than the waveform bandwidth. It should also be understood that with suitable modifications to the pulse compression ratio and to Doppler frequency offset relationships, pulse compression weighting may also be applied for performing time sidelobe suppression.

The embodiments are provided by way of example only, and other embodiments for implementing the methods described herein may be contemplated by one of skill in the pertinent art without departing from the intended scope of this disclosure. For example, processing systems described herein may include memory containing data, which may include instructions, the instructions when executed by a processor or multiple processors, cause the steps of a method for performing the operations set forth herein. The above-described processing components (e.g. waveform generator 18, pulse compression module 30, detection processor 34, velocity estimated 36 and/or angle/range estimation processor 38) may be embodied as a single multi-purpose processor, or any other number of discrete processors suitable for performing the described operations without departing from the scope of the present disclosure. Software may be embodied in a non-transitory machine readable medium upon which software instructions may be stored, the stored instructions when executed by a processor cause the processor to perform the steps of the methods described herein. Any suitable machine readable medium may be used, including but not limited to, magnetic or optical disks, for example CD-ROM, DVD-ROM, floppy disks and the like. Other media also fall within the intended scope of this disclosure, for example, dynamic random access memory (DRAM), random access memory (RAM), read-only memory (ROM) or flash memory may also be used.

While the foregoing invention has been described with reference to the above-described embodiment, various additional modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A signal processing system, comprising:
   a receiver configured to receive a return signal from a transmitted linear frequency modulated (LFM) signal;
   an analog to digital converter for converting the received return signal to digital form;
   one or more computer processors; and
   a memory in communication with the one or more processors and having program instructions stored thereon, which when executed by the one or more processors, cause the one or more processors to:
      apply a first matched compression filter to the digitized return signal for generating a first pulse compression response signal;
      apply a second mismatched compression filter to the digitized return signal for generating a second pulse compression response signal;
      perform detection processing on said first pulse compression response signal to identify samples in which a potential target is identified;
      calculate a ratio of the second pulse compression response signal to the first pulse compression response signal by selecting a real component portion of the second pulse compression response signal divided by the first pulse compression response signal for the identified target samples; and
      estimate a velocity of a potential target identified in the return signal according to the calculated ratio.

2. The system of claim 1, wherein the first matched compression filter comprises a sampled, time-reversed, complex conjugate of the transmitted LFM signal.

3. The system of claim 2, wherein the step of applying the first matched compression filter comprises pulse compressing the received signal by convolving the received digitized return signal with the first matched compression filter.

4. The system of claim 1, wherein the second mismatched compression filter comprises a sampled, time-reversed, complex conjugate of a mismatched difference reference, the mismatched difference reference comprising a sample of the transmitted LFM signal, wherein the sign of the sample of a second half of the signal is inverted.

5. The system of claim 4, wherein the step of applying the second mismatched compression filter comprises pulse compressing the received signal by convolving the received digitized return signal with the second mismatched compression filter.

6. The system of claim 1, further comprising:
a waveform generator for generating the LFM signal; and
a transmitter for transmitting the LFM signal.

7. The system of claim 6, wherein the transmitter and receiver comprise a radar transmitter and a radar receiver.

8. The system of claim 1, wherein the first and second pulse compression response signals comprise complex signals, and wherein the real component portion of the calculated ratio is determined according to:

$$r = \text{Re}\left\{\frac{z_d[n_{target}]}{z_m[n_{target}]}\right\}$$

where $z_d[n_{target}]$ represents the mismatched filter pulse compression response signal and where $z_m[n_{target}]$ represents the matched filter pulse compression response signal, for those samples $n_{target}$ in which a target was identified.

9. The system of claim 1, wherein the step of estimating a velocity of a potential target identified in the return signal according to the calculated ratio of the second pulse compression response signal to the first pulse compression response signal comprises:
calculating a Doppler frequency offset from the calculated ratio;
calculating Doppler frequency from the Doppler frequency offset; and
calculating the estimated velocity of the potential target from the Doppler frequency.

10. A method of estimating velocity of a target from a return signal originating from a linear frequency modulated (LFM) signal, the method comprising the steps of:
receiving a return signal from a transmitted LFM signal;
converting the received return signal to digital form;
applying a first matched compression filter to the digitized return signal for generating a first pulse compression response signal;
applying a second mismatched compression filter to the digitized return signal for generating a second pulse compression response signal;
identifying samples from said first pulse compression response signal in which a potential target is detected;
calculating a ratio of the second pulse compression response signal to the first pulse compression response signal by selecting a real component portion of the second pulse compression response signal divided by the first pulse compression response signal for the identified target samples; and
estimating a velocity of a potential target identified in the return signal according to the calculated ratio.

11. The method of claim 10, wherein the step of applying a first matched compression filter to the digitized return signal for generating a first pulse compression response signal comprises convolving a sampled, time-reversed, complex conjugate of the transmitted LFM signal with the digitized return signal.

12. The method of claim 10, wherein:
the step of applying a second mismatched compression filter to the digitized return signal for generating a second pulse compression response signal comprises convolving the digitized return signal with a sampled, time-reversed, complex conjugate of a mismatched difference reference, the mismatched difference reference comprising samples of the transmitted LFM signal, wherein the sign of the samples of a second half of the signal is inverted.

13. The method of claim 10, further comprising the steps of:
generating the LFM signal with a waveform generator; and
transmitting the LFM signal with a transmitter.

14. The method of claim 13, wherein the transmitter comprises a radar transmitter.

15. The method of claim 10, wherein the first and second pulse compression response signals comprise complex signals, and wherein the real component portion of the calculated ratio is determined according to:

$$r = \text{Re}\left\{\frac{z_d[n_{target}]}{z_m[n_{target}]}\right\}$$

where $z_d[n_{target}]$ represents the mismatched filter pulse compression response signal and where $z_m[n_{target}]$ represents the matched filter pulse compression response signal, for those samples $n_{target}$ in which a target was identified.

16. The method of claim 10, wherein the step of estimating a velocity of a potential target identified in the return signal according to the calculated ratio comprises:
calculating a Doppler frequency offset from the calculated ratio;
calculating Doppler frequency from the Doppler frequency offset; and
calculating the estimated velocity of the potential target from the Doppler frequency.

17. A digital processor system for estimating velocity of a target from a return signal originating from a linear frequency modulated (LFM) signal transmission, the return signal in-phase and quadrature-phase (I/Q) components having been converted to digital form, the system comprising:
a pulse compression module comprising:
a matched filter responsive to the digitized in-phase and quadrature-phase (I/Q) return signal for generating a matched pulse compression response signal;
a mismatched filter responsive to the digitized in-phase and quadrature-phase (I/Q) return signal for generating a mismatched pulse compression response signal;
a detector responsive to the matched pulse compression response signal for identifying samples in which a target is present;
a velocity estimation processor responsive to the mismatched pulse compression response signal, the matched pulse compression response signal, and the identified target samples for estimating a velocity of a potential target identified in the return signal, wherein the velocity estimation processor is configured to:
calculate a ratio of the mismatched pulse compression response signal to the matched pulse compression response signal by dividing the mismatched pulse compression response signal by the matched pulse compression response signal for the identified target samples;

calculate a Doppler frequency offset based on the value of the calculated ratio;

calculate a Doppler frequency according to the Doppler frequency offset and bandwidth of the LFM signal transmission; and calculate the estimated velocity of the potential target according to the Doppler frequency.

18. The system of claim 17, wherein the velocity estimation processor determines the real part of the pulse compression ratio as:

$$r = \frac{\left(\frac{\Delta f}{B}\right)}{\left|\frac{\Delta f}{B}\right| - 1} = \frac{\Delta \tilde{f}}{|\Delta \tilde{f}| - 1}$$

Where r is the pulse compression ratio, $\Delta f$ is the Doppler frequency offset, B is the LFM waveform bandwidth, and $$\Delta \tilde{f} = \frac{\Delta f}{B}$$

is the normalized Doppler frequency offset.

19. The system of claim 17, wherein the velocity estimation processor calculates the velocity of the potential target from the Doppler frequency according to:

$$v = -\frac{\Delta f}{f_c} \frac{c}{2}$$

where fc is the carrier frequency and c is the speed of propagation of the LFM signal transmission, and where $\Delta f$ represents the Doppler frequency.

20. The system of claim 17, wherein:

the mismatched filter comprises a sampled, time-reversed, complex conjugate of a mismatched difference reference, the mismatched difference reference comprising samples of the transmitted LFM signal of a given length, wherein the sign of the samples of a second half of the signal of said given length is inverted; and the matched filter comprises a sampled, time-reversed, complex conjugate of the transmitted LFM signal.

* * * * *